F. M. RIDENOUR.
RESILIENT WHEEL.
APPLICATION FILED JULY 11, 1922.
1,437,150.
Patented Nov. 28, 1922.
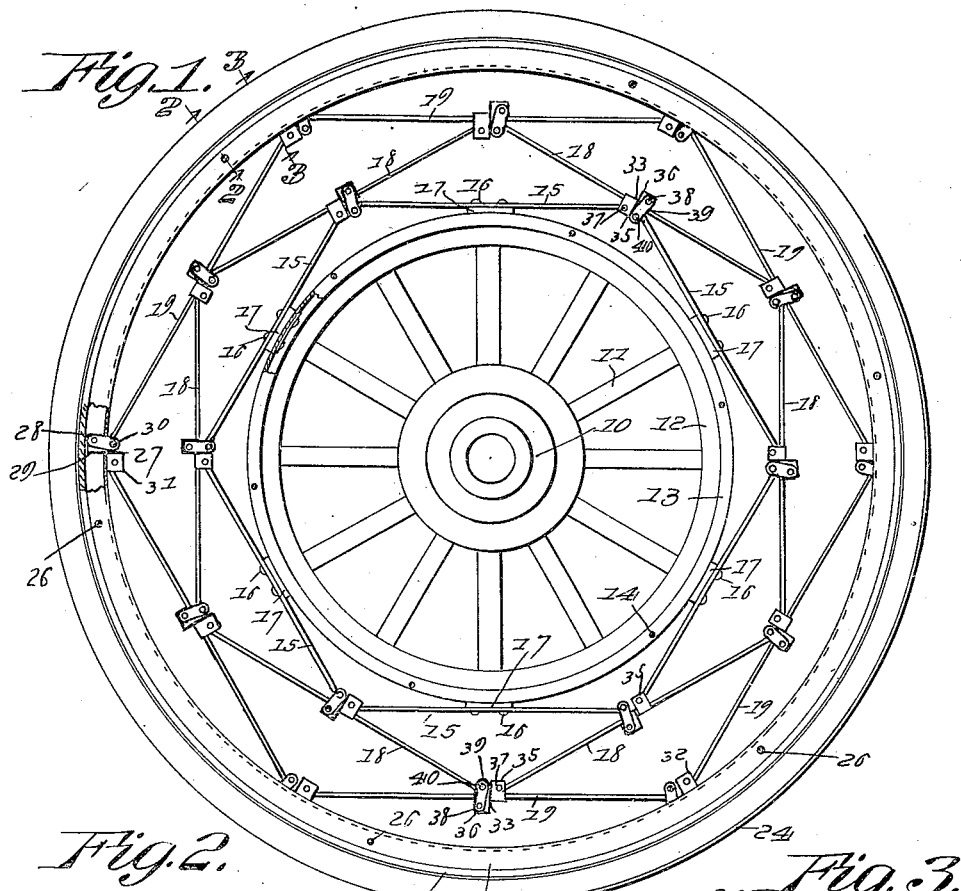
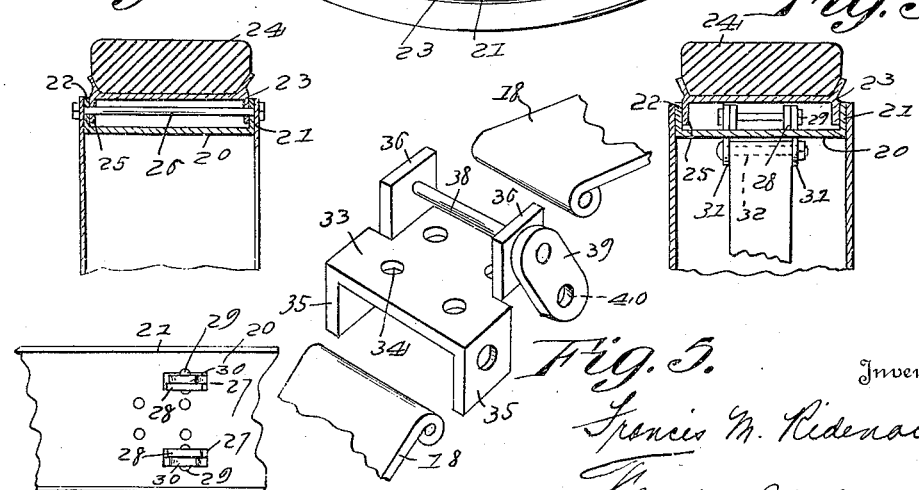
Inventor
Francis M. Ridenour,
By Frank S. Ingleman
Attorney Patented Nov. 28, 1922.

1,437,150

UNITED STATES PATENT OFFICE.

FRANCIS M. RIDENOUR, OF GAINESVILLE, TEXAS.

RESILIENT WHEEL.

Application filed July 11, 1922. Serial No. 574,168.

*To all whom it may concern:*

Be it known that I, FRANCIS M. RIDENOUR, a citizen of the United States of America, and resident of Gainesville, in the county of Cooke and State of Texas, have invented certain new and useful Improvements in Resilient Wheels, of which the following is a specification.

This invention relates to resilient wheels, and particularly to a wheel intended for use on automobiles, by means of which it is intended that its resilient character shall be such as to permit the use of cushion tires, while getting the same elastic or easy riding effect as is produced by the pneumatic tires now in common use.

It is an object, therefore, of this invention to produce mechanical means in associated relation with the hub section and a rim section of a wheel, by which the rim is resiliently held in spaced relation to the hub section, and by means of which a spring or cushioning action will result to the ends stated.

It is a further object of this invention to produce a resilient wheel of the character indicated in which resilient or spring elements are shackled or coupled together to permit such free movement of the parts as to obviate unnatural distortion of the springs or elements, and which will enable the wheel to absorb normal road shocks without impairing the device or cause undue wear of the parts.

It is a further object of this invention to produce a wheel, the action of the elements of which will not be impaired, by the accumulation of mud or foreign substances, since the said elements will be self-acting to displace or dislodge any such accumulations that may occur.

The invention furthermore contemplates the provision of a device of the character indicated which will be efficient and comparatively inexpensve.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a resilient wheel embodying the invention, partly in section;

Figure 2 illustrates an enlarged sectional view on the line 2—2 of Fig. 1;

Figure 3 illustrates a similar view on the line 3—3 of Fig. 1;

Figure 4 illustrates a plan view of the rim with the tire removed; and

Figure 5 illustrates a perspective view of fragments of elements of the construction, partially dismantled.

In these drawings I have shown an inner section which will be hereinafter termed the "hub" section, comprising a hub 10, spokes 11 and rim 12. This hub section is a miniature wheel, in the present embodiment of the invention, and the rim is preferably provided with a band or annular channel iron 13 embracing the periphery and parts of the sides of the said rim and secured in place by appropriate fastenings 14.

The element 13 may be applied in a number of ways, as one skilled in the art will understand, and therefore, further detailed description is believed unnecessary.

Inner springs or spring elements 15 are secured to the hub section by fastenings 16 and preferably by an interposed base or block 17 to give the proper bearing which the spring may engage. In the present embodiment of this invention, six such springs are employed and they are of uniform length. Their ends terminate in spaced relation to one another and in spaced relation to other spring elements 18, which may be termed intermediate spring elements. In the present embodiment of the invention, there are six intermediate spring elements and they extend across the ends of two of the spring elements 15 and terminate in spaced relation to outer spring elements 19, six of which are employed in the present embodiment of the invention.

The outer rim of the wheel, in this embodiment of the invention is constructed of a ring 20 having outwardly extending flanges 21 and 22 to which the annular tire seat 23 is applied, the said tire seat being provided with any suitable tire 24.

The tire seat 23 has flanges 25 which, in this embodiment of the invention, fit within the flanges 21 and 22, and these parts are secured together by fastenings 26 such as bolts.

The ring 20 has a plurality of apertures 27 with ears 28 extending outwardly on each side of each aperture, and these ears constitute anchorages for pins 29 on which links 30 are pivoted, the said links being of such length and in such relation to the outer spring elements as to afford a connection by which one end of each outer spring element is secured to the ring. The ring also has a plurality of pairs of lugs 31 which extend inwardly, and the outer spring elements have their ends remote from the links connected to the said lugs, so that during their movement, the outer spring elements oscillate slightly on pintles 32 extending through and supported by a pair of lugs.

Preferably at a point midway the length of each outer spring element, a shackle or coupling is provided, to which ends of the intermediate spring elements may be connected, and preferably midway between the ends of the intermediate spring elements, shackles or couplings are provided by which the inner spring elements are connected to the intermediate spring elements. As the shackles or couplings for the ends of the intermediate and inner spring elements are of identical construction, a description of one of them will suffice as a disclosure to one skilled in the art. Each shackle or coupling, therefore, comprises a base plate 33 having apertures 34 by which fastenings may be employed to secure it to its respective spring element. Each plate has a pair of apertured lugs or flanges 35 projecting preferably inwardly when the plate is applied to a spring element, and a pair of apertured lugs or ears 36 which extend preferably outwardly when the plate is secured to a spring element. A pin or coupling 37 extends through the apertures of the lugs or ears 35 and serves as a fixed pivot on which one end of one of the spring elements is secured, whereas the lugs or ears 36 constitute anchorages or supports for a pin 38 on which links 39 are oscillatably mounted, and these links are connected to the end of an adjacent spring element or what might be termed the next succeeding spring element in the circumference of the wheel.

It is seen from an inspection of the drawing, that the end of the spring element that is not displaceable with relation to the spring element to which it is attached, is paired with the end of the succeeding spring element which has a pivotal connection through the oscillatable links, and this allowance for movement permits a yielding action and insures such resiliency as will prove effective in absorbing jars and vibration.

It is seen that the links 39 are connected to the spring elements by pins or pivots 40, and as stated, the parts are duplicated and result in cooperative action of the spring elements that are interposed between the hub section and the rim section.

I claim:

1. In a resilient wheel, a hub section, inner spring elements secured to the hub section between their ends, intermediate spring elements extending across the ends of the inner spring elements, oscillatory means for connecting the end of one of the inner spring elements to the intermediate spring element, means for connecting the inner spring element to the next succeeding intermediate spring element, outer spring elements each of which extends across the ends of two adjacent spring elements, an oscillatory device by which one end of each intermediate spring element is connected to the outer spring element, means for connecting the opposite end of each intermediate spring element to the adjacent outer spring element, a rim, an oscillatory device carried by the rim for each outer spring element, means for connecting the oscillatory device to one end of one of the outer spring elements, and means for connecting another end of each outer spring element to the said rim.

2. In a resilient wheel, a hub section, inner spring elements secured to the hub section between their ends, intermediate spring elements extending across the ends of the inner spring elements, means for connecting the end of one of the inner spring elements to one of the intermediate spring elements, means for connecting the opposite end of each inner spring element to next succeeding intermediate spring element, progressively, outer spring elements, each of which extends across the ends of two adjacent spring elements, a device by which one end of each intermediate spring element is connected to an outer spring element, means for connecting the opposite end of each intermediate spring element to an adjacent outer spring element progressively, a rim, devices carried by the rim, and means for connecting the ends of the outer spring elements to the said devices.

3. In a resilient wheel, a hub section and a rim in spaced relation to each other, inner spring elements between their ends secured to the hub section and extending in a direction transversely of the axis of the hub, outer spring elements, means for securing the ends of the outer spring elements to the rim, and intermediate spring elements in a space between the inner and outer spring elements and extending in the general direction as to the axis of the hub occupied by the inner spring elements, means on each intermediate spring element for connecting the ends of the adjacent inner spring elements thereto, and means on the outer spring elements by which the adjacent ends of the intermediate spring elements are attached to the outer spring elements.

4. In a resilient wheel, a hub section having a rim, inner spring elements secured between their ends to the said rim and extending at angles to the axis of the hub, the ends of the said inner spring elements being in spaced relation to each other, an intermediate spring element spanning each space between adjacent ends of the inner spring elements, means secured between the ends of each intermediate spring element by which the ends of the inner spring elements which it spans is connected to said intermediate spring element, the said intermediate spring element extending in the same general direction with relation to the axis of the wheel as that occupied by the inner spring element, and outer spring elements, each of which spans a space between adjacent ends of the intermediate spring elements, means between the ends of the outer spring element by which the said adjacent ends of the intermediate spring elements are connected to the said outer spring element, a rim, and means for connecting the ends of the outer spring elements to the rim.

FRANCIS M. RIDENOUR.